(12) United States Patent
Ohara et al.

(10) Patent No.: US 11,272,545 B2
(45) Date of Patent: Mar. 8, 2022

(54) BASE STATION AND TERMINAL FOR TRANSMISSION OF RANDOM ACCESS PREAMBLES IN A RANDOM ACCESS PROCEDURE

(71) Applicant: NTT DOCOMO, INC., Tokyo (JP)

(72) Inventors: Tomoya Ohara, Tokyo (JP); Hiroki Harada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 124 days.

(21) Appl. No.: 16/482,145

(22) PCT Filed: Dec. 18, 2017

(86) PCT No.: PCT/JP2017/045281
§ 371 (c)(1),
(2) Date: Jul. 30, 2019

(87) PCT Pub. No.: WO2018/142786
PCT Pub. Date: Aug. 9, 2018

(65) Prior Publication Data
US 2019/0394809 A1    Dec. 26, 2019

(30) Foreign Application Priority Data
Feb. 3, 2017    (JP) .............................. JP2017-019143

(51) Int. Cl.
*H04W 4/00*    (2018.01)
*H04W 74/08*    (2009.01)
*H04W 74/00*    (2009.01)

(52) U.S. Cl.
CPC ..... *H04W 74/0833* (2013.01); *H04W 74/006* (2013.01)

(58) Field of Classification Search
CPC ......................... H04W 74/0833; H04W 74/006
See application file for complete search history.

(56) References Cited

U.S. PATENT DOCUMENTS

| | | | | |
|---|---|---|---|---|
| 2011/0013577 A1* | 1/2011 | Wang | ................. | H04W 74/002 370/329 |
| 2013/0058301 A1* | 3/2013 | Lee | .................... | H04W 74/002 370/329 |

(Continued)

FOREIGN PATENT DOCUMENTS

JP    2016-528791 A    9/2016

OTHER PUBLICATIONS

Huawei (R1-1611694, "Consideration of NR RACH preamble and channel design", Nov. 2016). (Year: 2016).*

(Continued)

*Primary Examiner* — Maharishi V Khirodhar
(74) *Attorney, Agent, or Firm* — Osha Bergman Watanabe & Burton LLP (57) ABSTRACT

Techniques for implementing proper transmission of RA preambles in a RA procedure are disclosed. An aspect of the present invention relates to a base station including a communication control unit configured to control radio communication with user equipment; and an RA procedure processing unit configured to perform a random access (RA) procedure with the user equipment, wherein the RA procedure processing unit indicates to the user equipment a maximum multiplexing number of RA preambles multiplexed into a radio resource capable of transmitting the RA preambles.

8 Claims, 9 Drawing Sheets

(56) References Cited

U.S. PATENT DOCUMENTS

| | | | | |
|---|---|---|---|---|
| 2015/0016312 | A1* | 1/2015 | Li | H04W 74/006 370/280 |
| 2017/0094689 | A1* | 3/2017 | Lin | H04L 27/2613 |
| 2018/0070380 | A1* | 3/2018 | Nagaraja | H04B 7/0695 |
| 2019/0028923 | A1* | 1/2019 | Futaki | H04W 74/0833 |
| 2020/0296765 | A1* | 9/2020 | Kim | H04W 74/0833 |

OTHER PUBLICATIONS

ZTE et al. ("WF on RACH transmission in 4-step Random access", R1-1701419) (Year: 2017).*

Cohere Technologies ( discussion on RACH procedure and Resources, R1-1701250) (Year: 2017).*

Fujitsu (R1-1700653, "Discussion on PRACH configuration in NR", Jan. 2017) (Year: 2017).*

Samsung (R1-1700891, "NR 4-step random access procedure", Jan. 2017) (Year: 2017).*

Ericsson (R1-1700298, "NR PRACH design") (Year: 2017).*

3GPP TS 36.321 V14.1.0; "3rd Generation Partnership Project; Technical Specification Group Radio Access Network; Evolved Universal Terrestrial Radio Access (E-UTRA); Medium Access Control (MAC) protocol specification (Release 14)" Dec. 2016 (98 Pages).

NTT Docomo, Inc.; "Discussion on 4-step random access procedure for NR"; 3GPP TSG RAN WG1 AH_NR Meeting, R1-1700614; Spokane, USA, Jan. 16-20, 2017 (7 Pages).

ZTE et. al.; "WF on Unified RACH Procedure"; 3GPP TSG RAN WG1 Meeting #86bis, R1-1610962; Lisbon, Portugal, Oct. 10-14, 2016 (6 Pages).

ZTE et. al.; "WF on RACH Procedure"; 3GPP TSG RAN WG1 Meeting #87, R1-1613281; Reno, USA, Nov. 14-18, 2016 (3 Pages).

LG Electronic et. al.;"WF on terminologies in 4-step RACH procedure"; 3GPP TSG RAN WG1 AH_NR Meeting, R1-1701462; Spokane, USA, Jan. 16-20, 2017 (3 Pages).

ZTE et.al.; "WF on UE beam switching"; 3GPP TSG RAN WG1 Meeting #87, R1-1613543; Reno, USA, Nov. 14-18, 2016 (5 Pages).

International Search Report issued in PCT/JP2017/045281 dated Mar. 6, 2018 (3 Pages).

Written Opinion of the International Searching Authority issued in PCT/JP2017/045281 dated Mar. 6, 2018 (3 Pages).

* cited by examiner

BASE STATION AND TERMINAL FOR TRANSMISSION OF RANDOM ACCESS PREAMBLES IN A RANDOM ACCESS PROCEDURE

CROSS-REFERENCE TO RELATED APPLICATIONS

This application is related to and claims benefit of priority under 35 U.S.C § 120 to International Application No. PCT/JP2017/045281 filed on Dec. 18, 2017 and Japanese Application No. JP 2017-019143 filed on Feb. 3, 2017, which are hereby incorporated herein by reference in their entirety.

TECHNICAL FIELD

The present invention relates to a radio communication system.

BACKGROUND ART

Presently, specifications for a fifth generation (5G) or NR (New RAT) system are being designed as a next radio communication system of LTE (Long Term Evolution) and LTE-Advanced. For a random access (RA) procedure of the NR, especially for a high frequency band, application of transmission and reception beam forming between a base station and user equipment has been studied. In the case where the beam forming is applied to transmit signals, it is considered that the base station or the user equipment performs beam sweeping or the like to determine a direction of a transmission beam (Tx-beam) to achieve better reception quality at the opposite communication side. Similarly, in the case where the beam forming is applied to receive signals, it is considered that the base station or the user equipment determines a direction of a reception beam (Rx-beam) to achieve better reception quality from the opposite communication side. Here, the beam for use in transmission of signals from the base station may be referred to as a BS transmission beam, and the beam for use in reception of signals at the base station may be referred to as a BS reception beam. Additionally, the beam for use in transmission of signals from the user equipment may be referred to as a UE transmission beam, and the beam for use in reception of signals at the user equipment may be referred to as a UE reception beam. Note that some signal transmission and reception may be omni-transmission/reception.

Figure 1:
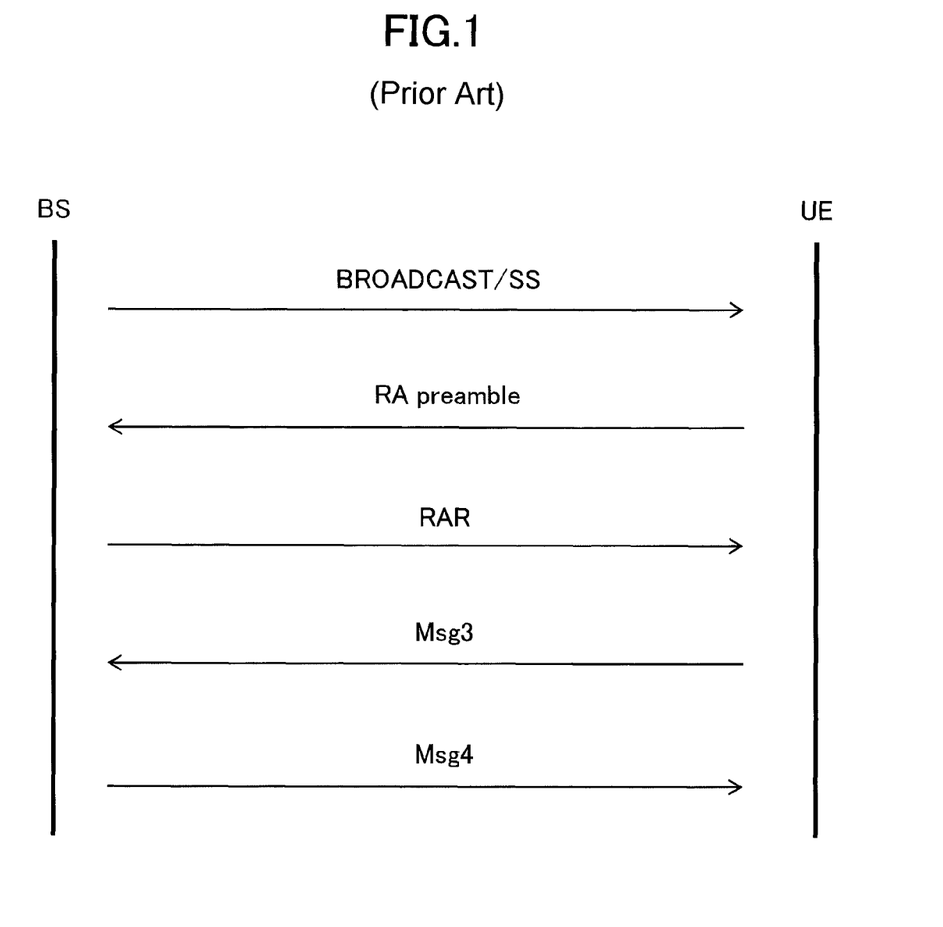
FIG. 1 is a sequence diagram illustrating a random access procedure.
Figure 2:
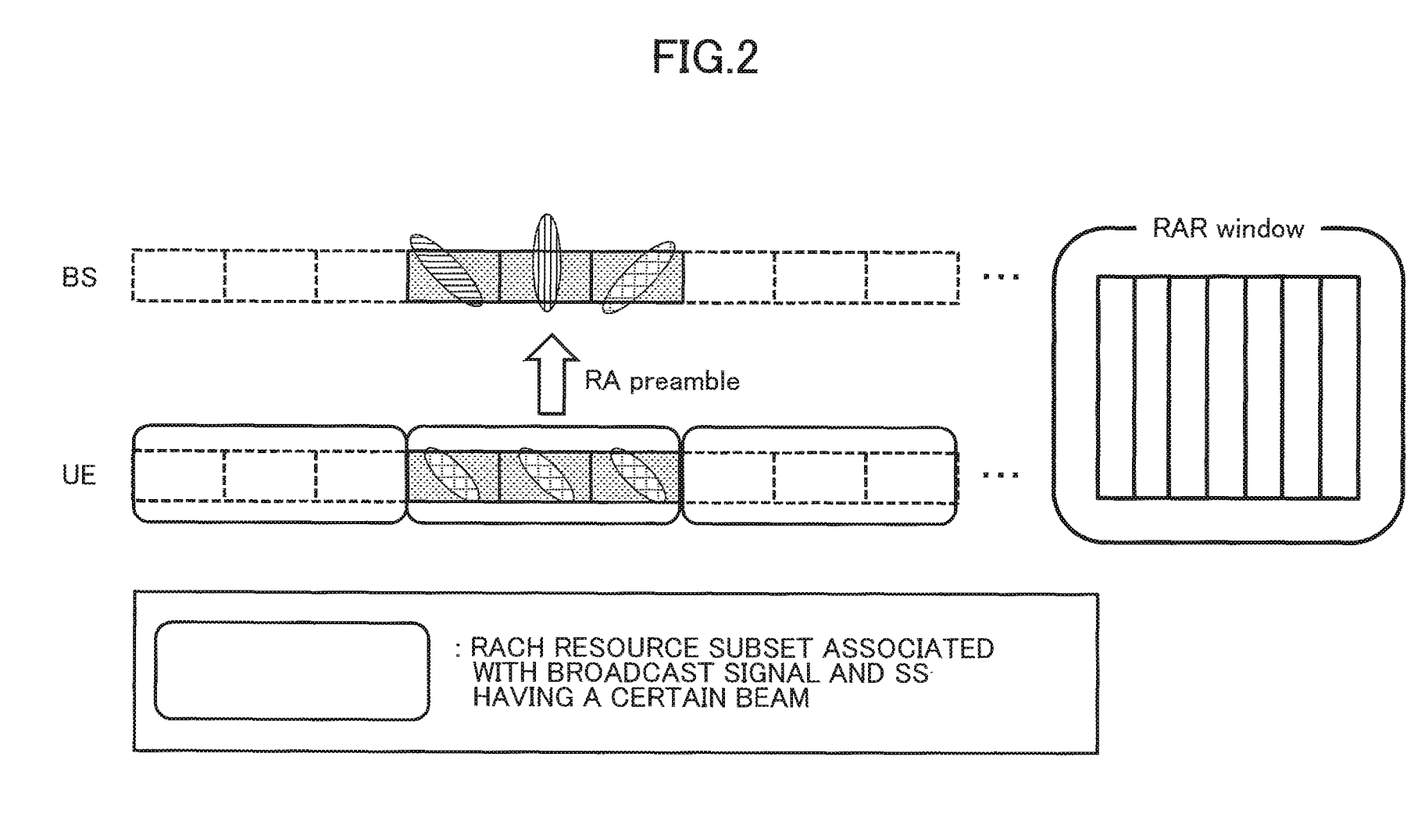
FIG. 2 is a diagram illustrating a RACH resource subset.

For example, the RA procedure can be executed by the processing sequence illustrated in FIG. 1. As illustrated in FIG. 1, the base station (BS) periodically transmits broadcast signals or synchronization signals (SS) in a cell. For example, beam sweeping is applied to the broadcast signals or the synchronization signals (SS) to be transmitted. In order to establish a radio connection to the base station, the user equipment (UE) visiting the cell transmits a RA preamble (Message 1) to the base station in a resource area indicated in the received broadcast signals or synchronization signals. Upon receiving the broadcast signals or the synchronization signals beam-controlled in various directions, as illustrated in FIG. 2, the user equipment selects the optimally received broadcast signal or synchronization signal and transmits the RA preamble to the base station in a RACH (Random Access Channel) resource subset corresponding to the selected broadcast signal or synchronization signal.

In response to the RA preamble, the base station returns a RA response (Message 2) to the user equipment. For example, as illustrated in FIG. 2, the base station receives the RA preamble transmitted from the user equipment while performing reception beam sweeping. At this time, the base station can determine a BS transmission beam corresponding to the UE reception beam that is optimum for the user equipment based on the position of the RACH resource subset with which the RA preamble has been received.

Subsequently, a Message 3 and a Message 4 are exchanged between the base station and the user equipment, and a radio connection is established.

PRIOR ART DOCUMENT

Non-Patent Document

Non-patent document 1: 3GPP TS 36.321 V14.1.0 (2016-12)
Non-patent document 2: R1-1701462
Non-patent document 3: R1-1700614
Non-patent document 4: R1-1610962
Non-patent document 5: R1-1613543
Non-patent document 6: R1-1613281

SUMMARY OF THE INVENTION

Problem to be Solved by the Invention

Figure 3:
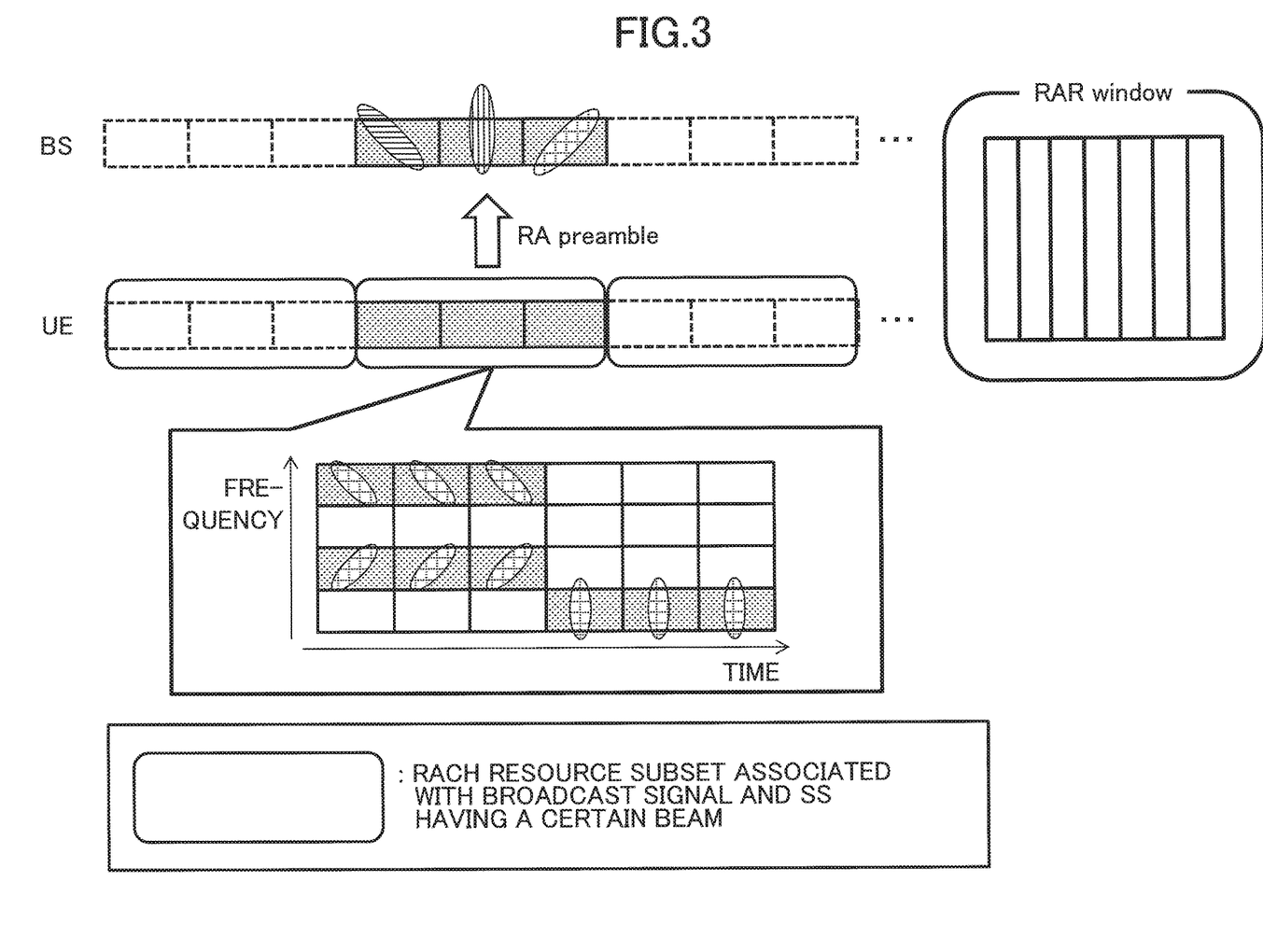
FIG. 3 is a diagram illustrating preamble transmission within the RACH resource subset.

For example, in the case where there is no correspondence of transmission and reception beams at the user equipment, that is, in the case where channel reciprocity is unable to be used at the user equipment, a UE transmission beam may be unable to be determined, even if the UE reception beam of the broadcast signals or synchronization signals is utilized. In this case, reduction of random access latency may be attempted by testing a large number of UE transmission beams in a short time, or information on an appropriate UE transmission beam may be attempted to be obtained at an earlier stage for a subsequent RA procedure, subsequent data transmission, etc. To this end, as illustrated in FIG. 3, the user equipment is expected to multiplex beam-controlled RA preambles in a frequency direction and/or a time direction within a RACH resource subset.

In the LTE, for example, since uplink resources are limited in TDD (Time Division Duplexing), frequency resources are prepared for multiple patterns of RA preambles, and the user equipment selects any of the frequency resources and transmits one RA preamble in the frequency resource to reduce a collision probability. For example, frequency/time resource information for the RA preambles is included in a RA-RNTI (Random Access-Radio Network Temporary Identifier), and the user equipment can monitor a PDCCH (Physical Downlink Control Channel), for example, and mask the RA-RNTI in a CRC (Cyclic Redundancy Check) portion to identify that the received RA response (RAR) is an RAR corresponding to which RA preamble in a frequency/time resource.

In the NR, a similar scheme may be also introduced for enabling, upon receiving the RAR, the user equipment to identify that the RAR corresponds to which RA preamble in a frequency/time resource, and, during multiplexing RA preambles in the frequency direction and/or the time direction, the frequency/time resource information is expected to be utilized. Additionally, for LTE, the RAR includes the corresponding preamble index information, and for NR, similarly, it is expected that a determination can be made as to which preamble index the RAR corresponds to.

Note that the contention probability of random access depends on a frequency resource amount, a time resource amount and a preamble index amount of the RA preamble. Ideally, a contention of the RA preamble is expected to be able to be avoided, if any one of the frequency resources, the time resources or the preamble indices differ.

Figure 4:
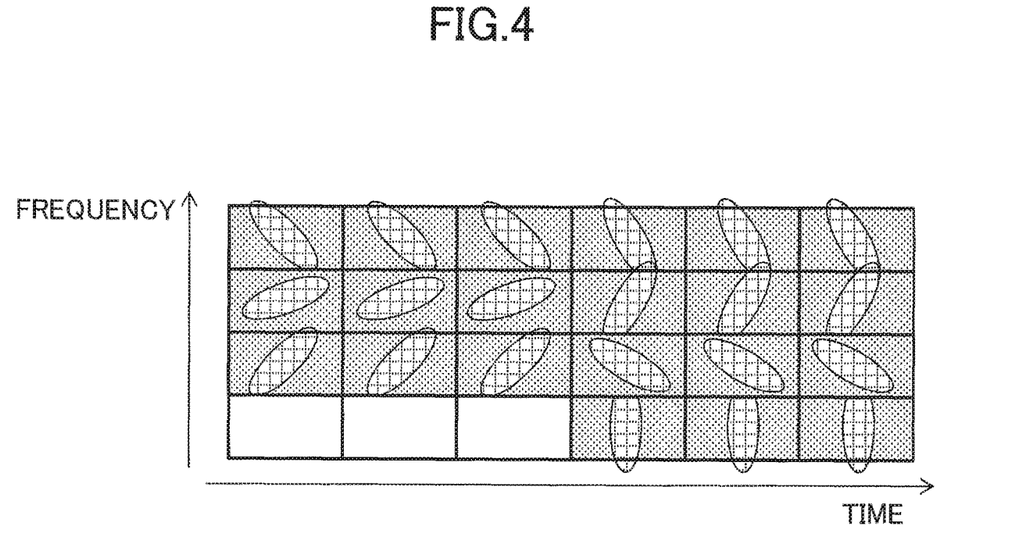
FIG. 4 is a diagram illustrating exemplary preamble transmission within the RACH resource subset.

Whereas, as illustrated in FIG. 4, if user equipment is allowed to use a large number of frequency/time resources within a RACH resource subset to transmit an RA preamble, a probability of contention with an RA preamble from any other user equipment within each resource increases. Namely, if the user equipment uses unnecessarily many frequency/time resources, avoidance of a contention of RA preambles among units of user equipment becomes difficult, based on a difference in frequency/time resources.

Additionally, upon transmission of the RA preambles having a large power difference in a certain resource (for example, the RA preambles transmitted from a user equipment near a base station and a user equipment at the cell edge), the base station may be unable to receive these RA preambles (for example, the preamble having a lower power) appropriately, even if they are the preambles of different RA preamble sequences. Namely, if RA preambles are transmitted with higher power in a large number of frequency/time resources, it becomes difficult for user equipment that transmits an RA preamble with lower power to establish a radio connection to the base station.

Furthermore, when RA preambles are transmitted in a large number of frequency/time resources, it is expected that interference with the surroundings becomes large.

In light of the above-described problem, an object of the present invention is to provide techniques for implementing proper transmission of RA preambles in an RA procedure.

Means for Solving the Problem

In order to solve the above-described problem, an aspect of the present invention relates to a base station including a communication control unit configured to control radio communication with a user equipment; and an RA procedure processing unit configured to process a random access (RA) procedure with the user equipment, wherein the RA procedure processing unit indicates to the user equipment a maximum multiplexing number of RA preambles multiplexed into a radio resource capable of transmitting the RA preambles.

Advantage of the Invention

According to the present invention, proper transmission of RA preambles in an RA procedure can be achieved.

EMBODIMENTS OF THE INVENTION

Embodiments of the present invention are described below with reference to the drawings.

In the following embodiments, user equipment and a base station are disclosed that perform a RA procedure where beam-controlled RA preambles can be multiplexed in radio resources. According to the embodiments described below, the base station indicates to the user equipment the maximum multiplexing number of RA preambles multiplexed in radio resources capable of transmitting the RA preambles, and the user equipment multiplexes the RA preambles in the radio resources in accordance with the indicated maximum multiplexing number and transmits the RA preambles to the base station.

Figure 5:
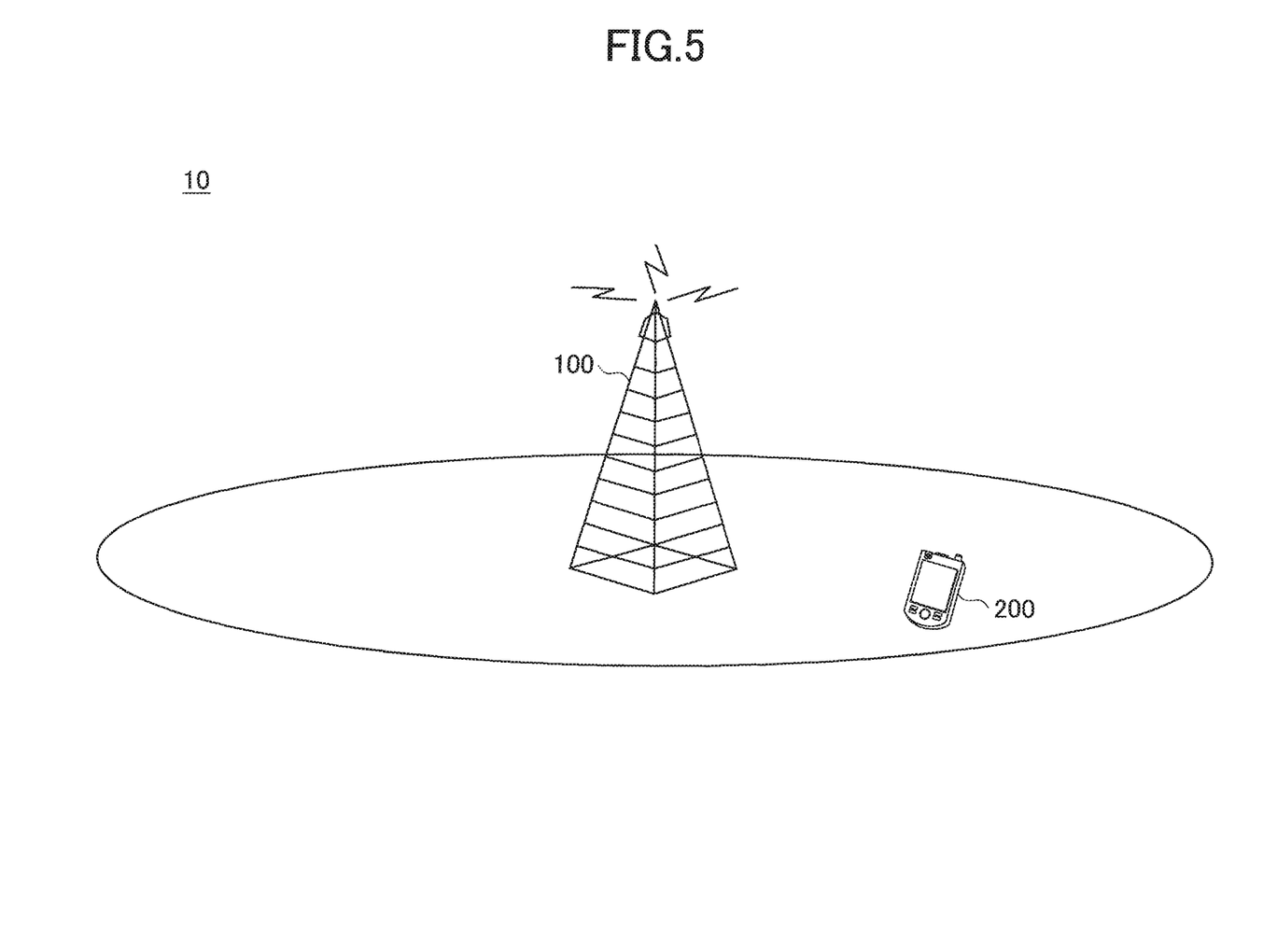
FIG. 5 is a schematic diagram illustrating a radio communication system according to an embodiment of the present invention.

First, a radio communication system according to an embodiment of the present invention is described with reference to FIG. 5. FIG. 5 is a schematic diagram illustrating a radio communication system according to an embodiment of the present invention.

As illustrated in FIG. 5, a radio communication system 10 is provided with a base station 100 and a user equipment 200. In the following embodiments, the radio communication system 10 is a radio communication system compliant with standards on and subsequent to 3GPP Rel-14 (for example, a 5G or NR system). However, the present invention is not limited to it, and it may be any other radio communication system to which a RA procedure for multiplexing precoded RA preambles into radio resources is applied.

The base station 100 serves one or more cells for radio communication with the user equipment 200. In the illustrated embodiment, only the single base station 100 is illustrated, but a large number of base stations 100 are generally disposed to cover a service area of the radio communication system 10.

The user equipment 200 is any appropriate information processing device with radio communication functionalities such as a smartphone, a mobile phone, a tablet, a wearable terminal and a communication module for M2M (Machine-to-Machine), and the user equipment 200 wirelessly connects to the base station 100 to use various communication services served from the radio communication system 10.

In the embodiments below, in radio resources capable of transmitting RA preambles, the user equipment 200 can multiplex the precoded or beam-controlled RA preambles into the radio resources and transmit it to the base station 100.

Figure 6:
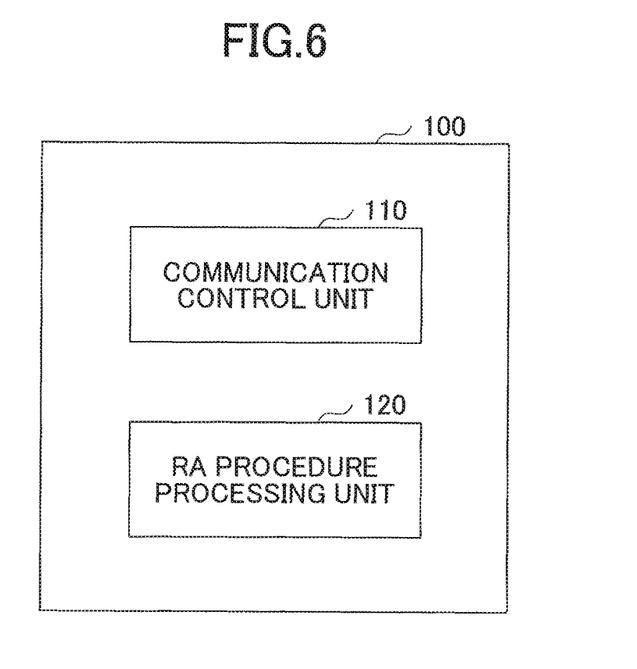
FIG. 6 is a block diagram illustrating a functional configuration of a base station according to an embodiment of the present invention.

Next, a base station according to an embodiment of the present invention is described with reference to FIG. 6. FIG. 6 is a block diagram illustrating a functional configuration of the base station according to one embodiment of the present invention.

As illustrated in FIG. 6, the base station 100 has a communication control unit 110 and a RA procedure processing unit 120.

The communication control unit 110 controls radio communication with the user equipment 200. Specifically, the communication control unit 110 assigns various radio signals such as a downlink/uplink control signal and a downlink/uplink data signal to radio resources and performs downlink and uplink communication with the user equipment 200 in the assigned radio resources. Additionally, the communication control unit 110 generates a transmission beam for the to-be-transmitted radio signal and transmits the generated transmission beams to the user equipment 200.

The RA procedure processing unit 120 performs a random access (RA) procedure with the user equipment 200 and indicates to the user equipment 200 a maximum multiplexing number of RA preambles into radio resources capable of transmitting the RA preambles. As stated above, if each user equipment 200 is allowed to use an arbitrary amount of frequency/time resources within radio resources (for example, a RACH resource subset) capable of transmitting RA preambles to transmit the RA preambles, the user equipment 200 may multiplex the RA preambles into an unnecessarily large amount of frequency/time resources. In this case, it is difficult to perform the RA procedure for each user equipment 200, for example, due to an increase in a probability of contention of RA preambles among units of user equipment. Accordingly, the RA procedure processing unit 120 may indicate a maximum number of multiplexing RA preambles, which are allowed to be multiplexed by each user equipment 200. For example, the RA procedure processing unit 120 may indicate the maximum multiplexing number in a broadcast signal, a synchronization signal, downlink control information (DCI) or RRC (Radio Resource Control) signaling. Alternatively, the maximum multiplexing number may be predefined in specifications.

Figure 7:
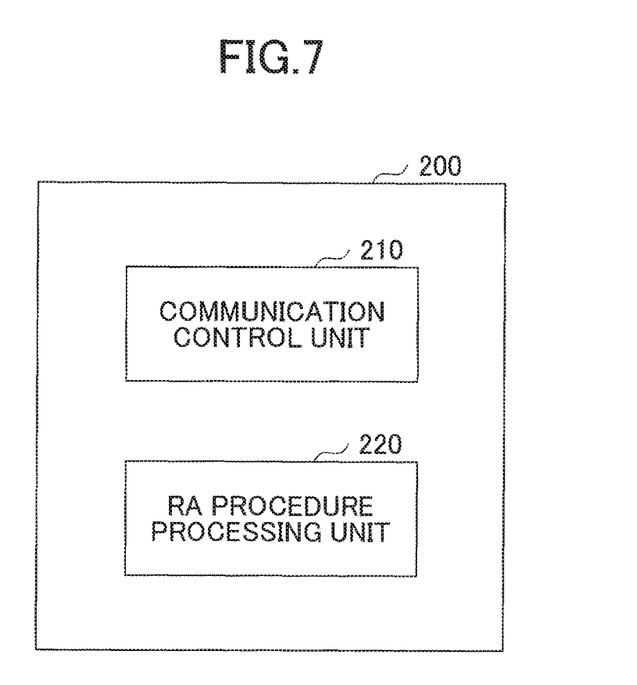
FIG. 7 is a block diagram illustrating a functional configuration of user equipment according to an embodiment of the present invention.

Next, user equipment according to an embodiment of the present invention is described with reference to FIG. 7. FIG. 7 is a block diagram illustrating a functional configuration of the user equipment according to an embodiment of the present invention.

As illustrated in FIG. 7, the user equipment 200 is provided with a communication control unit 210 and a RA procedure processing unit 220.

The communication control unit 210 controls radio communication with the base station 100. Specifically, the communication control unit 210 transmits and receives various radio signals such as a downlink/uplink control signal and a downlink/uplink data signal to and from the base station 100. Additionally, the communication control unit 210 receives a beam-controlled radio signal from the base station 100 and transmits a transmission beam for a to-be-transmitted radio signal to the base station 100.

The RA procedure processing unit 220 performs a random access (RA) procedure with the base station 100 and transmits to the base station 100 a RA preamble multiplexed into radio resources in accordance with the maximum multiplexing number for the RA preamble into radio resources capable of transmitting the RA preambles. Specifically, the RA procedure processing unit 220 multiplexes a number of RA preambles less than or equal to the maximum multiplexing number indicated from the base station 100 into the radio resources for transmission of the RA preambles and transmits radio signals, into which the RA preambles are multiplexed, to the base station 100. For example, the RA procedure processing unit 220 may receive the maximum multiplexing number in a broadcast signal, a synchronization signal, downlink control information (DCI) or RRC signaling. Alternatively, the maximum multiplexing number may be predefined in specifications.

Figure 8:
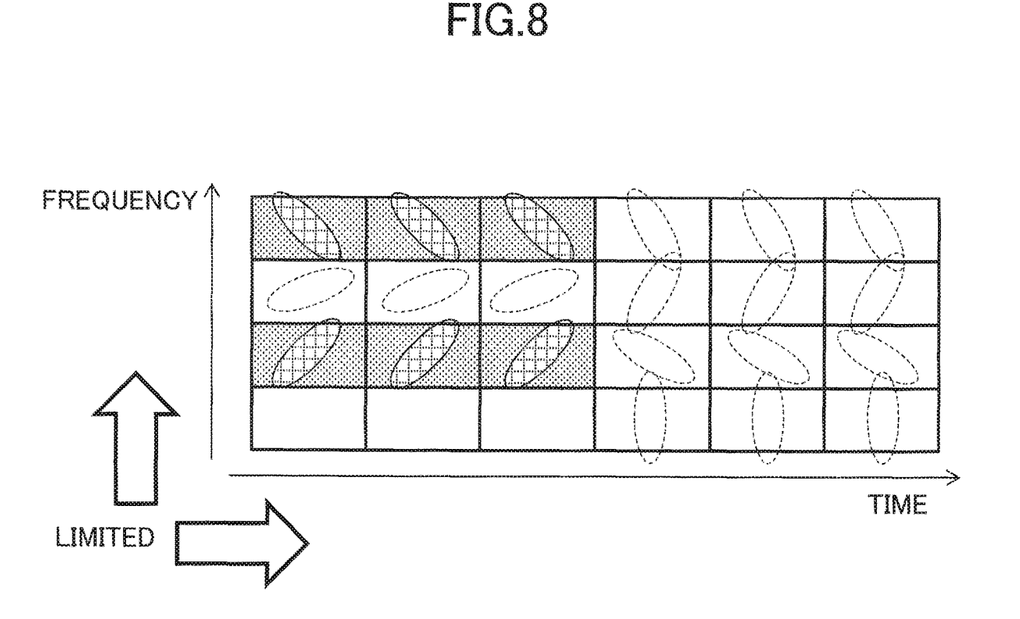
FIG. 8 is a diagram illustrating preamble transmission according to an embodiment of the present invention.

In an embodiment, the maximum multiplexing number may be indicated in one or more of a frequency resource multiplexing number, a time resource multiplexing number, a total multiplexing number of frequency and time resources and a preamble index number. For example, when the RA procedure processing unit 120 indicates a frequency resource multiplexing number and/or a time resource multiplexing number, where the user equipment is allowed to transmit the RA preambles, to the user equipment 200, the RA procedure processing unit 220 may multiplex a number of RA preambles less than or equal to the indicated frequency resource multiplexing number and/or time resource multiplexing number into frequency resources and time resources and transmit them to the base station 100. For example, in the example as illustrated in FIG. 8, the frequency resource multiplexing number, the time resource multiplexing number and the preamble index number may be configured as two, three and two, respectively, and the RA procedure processing unit 220 may transmit two types of RA preambles, which are beam-controlled in accordance with the configured frequency resource multiplexing number and time resource multiplexing number, to the base station 100. These two preamble indices may be the same or different, and specifically the preamble index number may be one or two. Note that the frequency resource multiplexing number and/or the time resource multiplexing number may be indicated with frequency resource positions and/or time resource positions for which multiplexing is allowed for the user equipment 200, for example. Additionally, the time resource multiplexing number may be the number of preambles included in a preamble format. Alternatively, if a unit indicated in the preamble format is set as one, the time resource multiplexing number may be set as the number of units. According to the present embodiment, the number of RA preambles transmitted from the user equipment 200 can be limited, and failure of the RA procedure due to an increase in the contention probability of RA preambles among the units of user equipment can be reduced.

Additionally, in an embodiment, the RA procedure processing unit 120 may indicate the maximum multiplexing number corresponding to communication quality of the radio communication between the base station 100 and the user equipment 200. Additionally, the communication control unit 210 may measure the communication quality of the radio communication between the base station 100 and the user equipment 200, and the RA procedure processing unit 220 may multiplex the RA preamble into the radio resource in accordance with the maximum multiplexing number corresponding to the measured communication quality. Specifically, when the maximum multiplexing numbers corresponding to respective communication qualities are indicated from the base station 100 or predefined in specifications, the communication control unit 210 measures the communication quality such as a path loss or a reception quality of the radio communication between the base station 100 and the user equipment 200 based on a broadcast signal or a synchronization signal received from the base station 100. Then, the RA procedure processing unit 220 may identify the maximum multiplexing number corresponding to the measured communication quality from among the maximum multiplexing numbers corresponding to the respective communication qualities as indicated from the base station 100 or predefined in the specifications, and multiplex the RA preambles into radio resources in accordance with the identified maximum multiplexing number to transmit radio signals, into which the RA preambles are multiplexed, to the base station 100. Here, the maximum multiplexing numbers corresponding to the respective communication qualities may be represented in a table form, a function form or the like. For example, if the communication quality is high (the path loss is small or the like), the maximum multiplexing number may be set to a relatively small value, and if the communication quality is low (the path loss is large), the maximum multiplexing number may be set to a relatively large value. As a result, the maximum multiplexing number may be set to a smaller value for the user equipment 200 located near the base station 100 to prevent the RA preambles from other units of user equipment 200 from being blocked, and the maximum multiplexing number may be set to a greater value for the user equipment 200 located far away from the base station 100 to enhance reception chances of the RA preambles at the base station 100. According to the present embodiment, the RA preambles can be transmitted with an appropriate multiplexing number depending on the communication quality between the base station 100 and the user equipment 200.

Figure 9:
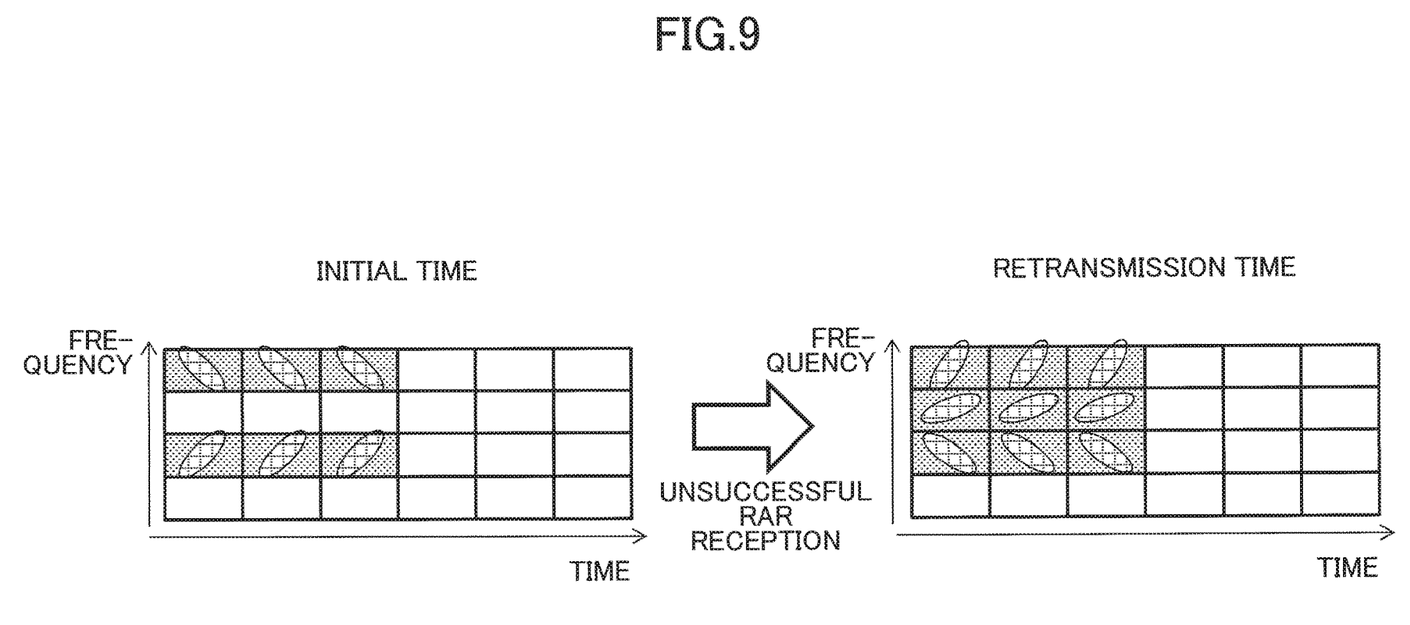
FIG. 9 is a diagram illustrating preamble transmission according to an embodiment of the present invention.

Furthermore, in an embodiment, the RA procedure processing unit 120 may configure a different maximum multiplexing number for a different transmission time of the RA preamble. Additionally, the RA procedure processing unit 220 may multiplex the RA preamble into the radio resource in accordance with the different maximum multiplexing numbers configured for the different transmission times of the RA preamble. For example, the RA procedure processing unit 120 may configure the respective maximum multiplexing numbers of the RA preamble for initial transmission and retransmission as different values and indicate the different maximum multiplexing numbers in a broadcast signal, a synchronization signal, downlink control information (DCI) or RRC signaling. Alternatively, the different maximum multiplexing numbers for initial transmission and retransmission may be predefined in specifications. For example, the maximum multiplexing number for retransmission may be set to a greater value than that of initial transmission, as illustrated in FIG. 9. This is because the base station 100 has failed to receive the RA preamble at initial transmission and accordingly a larger number of RA preambles can be transmitted at retransmission to increase a reception probability of the RA preambles at the base station 100. The RA procedure processing unit 220 may transmit different numbers of RA preambles to the base station 100 at respective transmission opportunities in accordance with the different maximum multiplexing numbers indicated from the base station 100 or predefined in the specifications. According to the present embodiment, if the RA preamble has not been properly received at the base station in the previous transmission time, the RA preamble can be transmitted with the different multiplexing number, which improves a successful reception probability of the RA preambles at retransmission.

Furthermore, the maximum multiplexing number may be configured depending on retransmission triggering conditions. For example, if the RA preamble is retransmitted due to unsuccessful reception from the base station 100 at the user equipment 200 of the RAR for the RA preamble at initial transmission, the RA procedure processing unit 220 may transmit a larger number of RA preambles to the base station 100 at retransmission. As a result, more UE transmission beams and/or finer UE transmission beams can be attempted, and a frequency diversity effect can be also expected. Alternatively, if the RA preamble is retransmitted due to a collision of a contention resolution in Message 4, the RA procedure processing unit 220 may transmit a smaller number of RA preambles to the base station 100 at retransmission. This is because many collisions may arise and the RA preambles are prevented from being unnecessarily multiplexed. According to the present embodiment, the maximum multiplexing number at retransmission can be properly adjusted depending on the retransmission triggering conditions.

Additionally, in an embodiment, the RA procedure processing unit 120 may indicate frequency/time resource information and/or preamble index information to the user equipment 200 before reception of the RAR at the user equipment 200. Here, the frequency/time resource information indicates frequency/time positions of radio resources where the user equipment 200 is allowed to transmit the RA preamble, and the preamble index information is information to identify the RA preambles. For example, the frequency/time resource information and/or the preamble index information may be included in a RA-RNTI or a RAR. For example, similar to the LTE, the frequency/time resource information may be included in the RA-RNTI, and the preamble index information may be included in the RAR. Alternatively, the frequency/time resource information may be included in the RAR, and the preamble index information may be included in the RA-RNTI. Alternatively, the frequency/time resource information and/or the preamble index information may be indicated to the user equipment 200 in any of combinations thereof. Also, the frequency/time resource information and/or the preamble index information may be indicated with a resource position of the RAR or with correspondence such as a relative position to a resource position of a Message 3 grant. Alternatively, the frequency/time resource information and/or the preamble index information may be indicated with correspondence of a relative position to a resource position of the RA preamble corresponding to the RAR. According to the present embodiment, the frequency/time resource information and/or the preamble index information required for the RA procedure can be indicated to the user equipment 200 in various manners.

Here, the block diagrams for use in the above description of embodiments show blocks for functional units. These functional blocks (components) are implemented in any combination of hardware and/or software items. Additionally, the implementations of the respective functional blocks are not particularly limited. In other words, the respective functional blocks may be implemented in a physically and/or logically coupled single device or in multiple devices where two or more physically and/or logically separated devices are connected directly and/or indirectly (for example, in wired and/or wireless manners).

Figure 10:
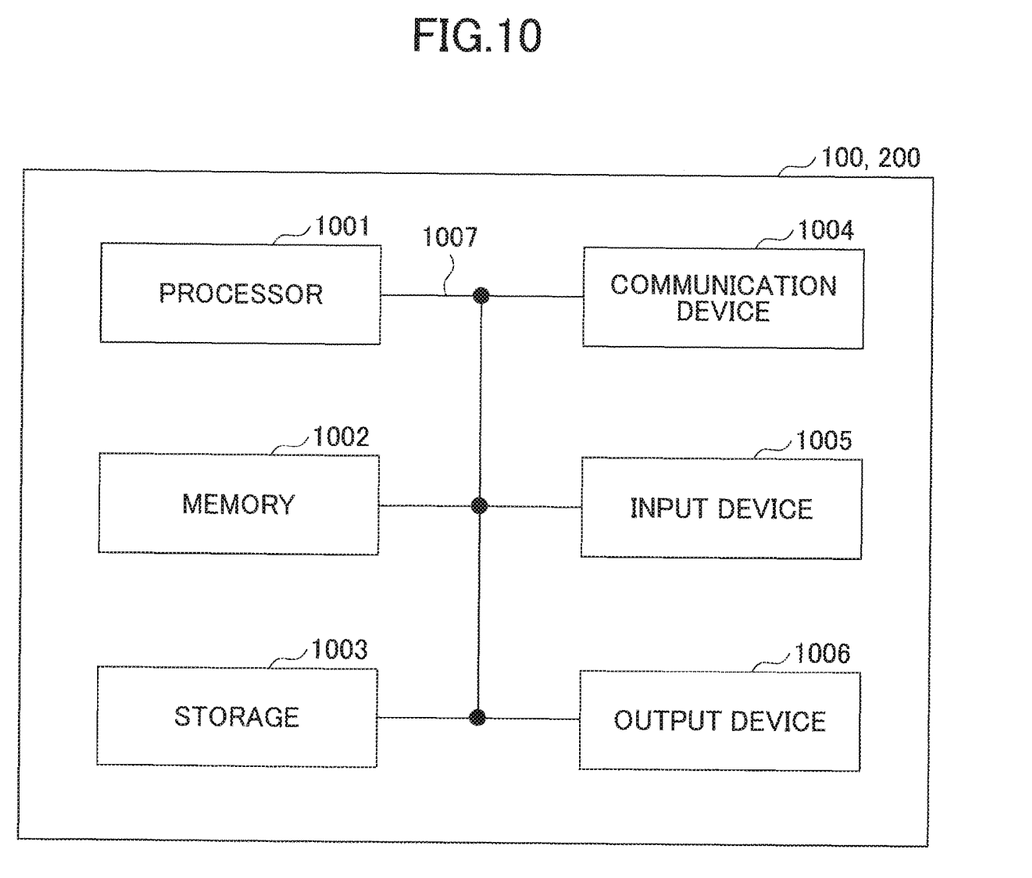
FIG. 10 is a block diagram illustrating a hardware configuration of a user equipment and a base station according to an embodiment of the present invention.

For example, the base station 100 and the user equipment 200 according to one embodiment of the present invention may function as a computer processing the radio communication method according to the present invention. FIG. 10 is a block diagram for illustrating a hardware configuration of the base station 100 and the user equipment 200 according to one embodiment of the present invention. The base station 100 and the user equipment 200 as stated above may each be physically configured as a computer device including a processor 1001, a memory 1002, a storage 1003, a communication device 1004, an input device 1005, an output device 1006, a bus 1007 or the like.

Note that the term "apparatus" can be interchangeably read as a circuit, a device, a unit or the like. The hardware configuration of the base station 100 and the user equipment 200 may each be arranged to include one or more of the illustrated devices or without including a part of the devices.

Respective functions in the base station 100 and the user equipment 200 are implemented by loading a predetermined software item (program) into hardware items such as the processor 1001 and the memory 1002 to cause the processor 1001 to execute operations, perform communication with the communication device 1004 and control read and/or write operations on data from/in the memory 1002 and the storage 1003.

The processor 1001 runs an operating system to control the whole computer, for example. The processor 1001 may be arranged with a central processing unit (CPU) including an interface with a peripheral device, a control device, a calculation device, a register and the like. For example, the above-stated components may be implemented in the processor 1001.

Additionally, the processor 1001 loads programs (program codes), software modules and data from the storage 1003 and/or the communication device 1004 into the memory 1002 and executes various operations in accordance with them. As the programs, programs for causing the computer to perform at least a part of operations as described in the above embodiments are used. For example, operations by the components in the base station 100 and the user equipment 200 may be implemented with control programs stored in the memory 1002 and executed by the processor 1001, and other functional blocks may be similarly implemented. It is described that the above-stated various operations are performed by the single processor 1001, but they may be performed with two or more processors 1001 simultaneously or sequentially. The processor 1001 may be implemented with one or more chips. Note that the programs may be transmitted from a network via an electric communication line.

The memory 1002 is a computer-readable storage medium and may be arranged with at least one of a ROM (Read Only Memory), an EPROM (Erasable Programmable ROM), an EEPROM (Electrically Erasable Programmable ROM), a RAM (Random Access Memory) or the like, for example. The memory 1002 may be referred to as a register, a cache, a main memory (main storage device) or the like. The memory 1002 can store programs (program codes), software modules or the like that can be executed to implement the radio communication method according to one embodiment of the present invention.

The storage 1003 is a computer-readable storage medium and may be arranged with at least one of an optical disk such as a CD-ROM (Compact Disc ROM), a hard disk drive, a flexible disk, a magnetic optical disk (for example, a compact disk, a digital versatile disk, a Blu-ray (registered trademark) disk), a smart card, a flash memory (for example, a card, a stick, a key drive), a floppy (registered trademark), a magnetic strip or the like. The storage 1003 may be referred to as an auxiliary storage device. The above-stated storage medium may be a database or a server including the memory 1002 and/or the storage 1003 or any other appropriate medium.

The communication device 1004 is a hardware item (transceiver device) for communication over computers via a wired and/or wireless network and may be also referred to as a network device, a network controller, a network card, a communication module or the like. For example, the above-stated components may be implemented in the communication device 1004.

The input device 1005 is an input device for receiving external inputs (for example, a keyboard, a mouse, a microphone, a switch, a button, a sensor or the like). The output device 1006 is an output device for providing external outputs (for example, a display, a speaker, a LED ramp or the like). Note that the input device 1005 and the output device 1006 may be integrally arranged (for example, a touch panel).

Additionally, the respective devices such as the processor 1001 and the memory 1002 are connected with each other via the bus 1007 for communicating information. The bus 1007 may be arranged with a single bus or different buses for different devices.

Additionally, the base station 100 and the user equipment 200 may be arranged to include a hardware item such as a macro processor, a digital signal processor (DSP), an ASIC (Application Specific Integrated Circuit), a PLD (Programmable Logic Device), a FPGA (Field Programmable Gate Array) or the like, and a part or all of the functional blocks may be implemented in the hardware item. For example, the processor 1001 may be implemented with at least one of these hardware items.

Transmission of information is not limited to the embodiments/implementations as described in the present specification and may be made in any other manner. For example, information may be transmitted in physical layer signaling (for example, DCI (Downlink Control Information) and UCI (Uplink Control Information)), upper layer signaling (for example, RRC (radio Resource Control) signaling, MAC (medium Access Control) signaling, broadcast information (MIB (master Information Block) and SIB (System Information Block)) or any other signal or combinations thereof. Also, the RRC signaling may be referred to as an RRC message and may be an RRC Connection Setup message, an RRC Connection Reconfiguration message or the like.

The respective embodiments/implementations as described in the present specification may be applied to systems using LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA 2000, UMB (Ultra Mobile Broadband), IEEE 802.11 (Wi-Fi), IEEE 802.16 (WiMAX), IEEE 802.20, UWB (Ultra-WideBand), Bluetooth (registered trademark) or any other appropriate system or next-generation systems enhanced based on them.

Procedures, sequences, flowcharts or the like of the respective embodiments/implementations as described in the present specification may be permutable, as long as there is not inconsistency. For example, for methods as described in the present specification, various steps are presented in an exemplary order, and the present invention is not limited to the presented certain order.

Certain operations performed by the base station 100 as described in the present specification may be performed by its upper node in some cases. In a network including one or more network nodes having base stations, various operations performed to communicate with terminals may be apparently performed by the base stations and/or network nodes other than the base stations (for example, a MME or an S-SW can be assumed, but the network nodes are not limited to them). Although it has been described that the single network node other than the base stations is used in the above example, combinations of multiple other network nodes (for example, an MME and an S-GW) may be used.

Information and others may be output from an upper layer (or a lower layer) to a lower layer (or an upper layer). They may be input and output via multiple network nodes.

Incoming and outgoing information and others may be stored in a certain location (for example, a memory) and/or managed in a management table. The incoming and outgoing information and others may be overwritten, updated or added. The outgoing information and others may be deleted. The incoming information and others may be transmitted to other device.

Determination may be made with a one-bit value (0 or 1), a Boolean value (true or false) or numerical comparison (for example, comparison with a predetermined value).

The embodiments/implementations as described in the present specification may be used singularly or in combinations or switched in connection with execution. Also, indication of predetermined information (for example, indication "it is X") is not limited to explicit manners and may be performed implicitly (for example, the predetermined information is not indicated).

Although the present invention is described in detail, it is apparent to those skilled in the art that the present invention is not limited to the embodiments as described in the present specification. The present invention can be implemented as modifications and variations without departing from the gist and scope of the present invention as defined in claims. Thus, the description in the present specification is intended for exemplary description and does not mean any restriction to the present invention.

Software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function or the like regardless of the software being referred to as software, a firmware, a middleware, a microcode, a hardware descriptive language or other names.

Additionally, the software, the instruction or the like may be transmitted and received via a transmission medium. For example, if the software is transmitted from a website, a server or other remote sources by using wired techniques such as a coaxial cable, an optical fiber cable, a twist pair and a digital subscriber line (DSL) and/or wireless techniques such as infrared, radio frequency and microwave, these wired techniques and/or wireless techniques are included within definition of a transmission medium.

Information, signals or the like as described in the present specification may be represented with use of any of various different techniques. For example, data, an instruction, a command, information, a signal, a bit, a symbol, a chip and so on referred to throughout the above description may be represented with a voltage, a current, an electromagnetic wave, a magnetic field, a magnetic particle, an optical field, a photon or any combination thereof.

Note that terms described in the present specification and/or terms required to understand the present specification may be replaced with terms having the same or similar meanings. For example, a channel and/or a symbol may be a signal. Additionally, the signal may be a message. Additionally, a component carrier (CC) may be referred to as a carrier frequency, a cell or the like.

The terms "system" and "network" for use in the present specification are interchangeably used.

Additionally, information, a parameter and so on as described in the present specification may be represented with an absolute value, a relative value from a predetermined value or other corresponding information. For example, a radio resource may be specified with an index.

Names as used for the above-stated parameters are not restrictive from any point. Furthermore, there are some cases where formulae and so on using these parameters may be different from ones as explicitly disclosed in the present specification. Various channels (for example, a PUCCH, a PDCCH or the like) and information elements (for example, a TPC or the like) can be identified with any preferred names, and the various names assigned to these various channels and information elements are not restrictive from any standpoint.

A base station can accommodate one or more (for example, three) cells (also referred to as sectors). If the base station accommodates multiple cells, the whole coverage area of the base station can be segmented into multiple smaller areas, and the respective smaller areas can provide communication services with a base station subsystem (for example, indoor small base station RRH: Remote Radio Head). The terminology "cell" or "sector" indicates a part or whole of the coverage area of the base station providing communication services in the coverage and/or the base station subsystem. Furthermore, the terminologies "base station", "eNB", "cell" and "sector" can be interchangeably used in the present specification. The base station may be referred to as terminologies such as a fixed station, a NodeB, an eNodeB (eNB), an access point, a femtocell and a small cell.

A mobile station may be referred to by those skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or any other appropriate terminologies.

There are some cases where terms "determining" as used in the present specification may include various operations. For example, "determining" may include deeming that a result of calculating, computing, processing, deriving, investigating, looking up (e.g., search in a table, a database, or another data structure), or ascertaining is determined. Furthermore, "determining" may include, for example, deeming that a result of receiving (e.g., reception of information), transmitting (e.g., transmission of information), input, output, or accessing (e.g., accessing data in memory) is determined. Furthermore, "determining" may include deeming that a result of resolving, selecting, choosing, establishing, or comparing is determined. Namely, "determining" may include deeming that some operation is determined.

The terms "connected", "coupled" or all variations thereof mean direct or indirect connection or coupling between two or more elements and can include existence of one or more intermediate elements between two mutually "connected" or "coupled" elements. The coupling or connection between elements may be physical, logical or in combinations thereof. If they are used in the present specification, it can be considered that two elements are mutually "connected" or "coupled" with use of one or more electric wires, cables and/or print electric connections and as several non-limiting and non-comprehensive examples, with use of electromagnetic energy such as electromagnetic energy having a wavelength of a radio frequency domain, a microwave domain and an optical (both visible and invisible) domain.

A reference signal can be omitted as a RS (Reference Signal) and may be referred to as a pilot depending on applied standards.

The recitation "based on" as used in the present specification does not mean "only based on", unless specifically stated otherwise. In other words, the recitation "based on" means both "only based on" and "at least based on".

Any reference to elements with use of terminologies such as "first", "second" and so on as used in the present specification does not limit the amount or order of these elements in general. These terminologies can be used in the present specification as convenient manners for distinguishing between two or more elements. Accordingly, the reference to the first and second elements does not mean that only the two elements are used there or the first element has to precede the second element in any fashion.

The "means" in a configuration of each apparatus as stated above may be replaced with "unit", "circuit", "device" or the like.

As long as the terms "include", "including" and variations thereof are used in the present specification or claims, these terms are intended to be inclusive similar to the term "comprising". Furthermore, the term "or" as used in the present specification or claims is intended not to be an exclusive OR.

A radio frame may be arranged with one or more frames in a time domain. In the time domain, one or more frames each may be referred to as a subframe. The subframe may be further arranged with one or more slots in the time domain. The slot may be further arranged with one or more symbols (OFDM symbols, SC-FDMA symbols and so on) in the time domain. Any of the radio frame, the subframe, the slot and the symbol represents a time unit for transmitting signals. The radio frame, the subframe, the slot and the symbol may be referred to in other corresponding manners. For example, in LTE systems, a base station performs scheduling to assign radio resources (frequency bandwidths, transmission power and so on available in the mobile station) to mobile stations. The minimum time unit for scheduling may be referred to as a TTI (Transmission Time Interval). For example, one subframe, multiple contiguous subframes or one slot may be referred to as the TTI. A resource block (RB) may be a resource assignment unit in the time domain and the frequency domain and may include one or more contiguous subcarriers in the frequency domain. Also, in the time domain, the resource block may include one or more symbols and have one slot, one subframe or one TTI in length. The single TTI and subframe each may be arranged with one or more resource blocks. The above-stated arrangement of radio frame is merely exemplary, and the number of subframes in the radio frame, the number of slots in the subframe, the number of symbols and resource blocks in the slot and the number of subcarriers in the resource block can be changed in any manner.

Although the embodiments of the present invention are described above in detail, the present invention is not limited to the above-described specific embodiments, and various modifications and variations can be made within the gist of the present invention as recited in claims.

LIST OF REFERENCE SYMBOLS 10 radio communication system
100 base station
110 communication control unit
120 RA procedure processing unit
200 user equipment
210 communication control unit
220 RA procedure processing unit

The invention claimed is:

1. A base station comprising:
a processor coupled to a memory, configured to:
control radio communication with a terminal, and
process a random access (RA) procedure with the terminal,
wherein the processor indicates to the terminal, by using downlink control information, a maximum multiplexing number of precoded RA preambles for a transmission time multiplexed into a radio resource capable of transmitting the precoded RA preambles, and
wherein the processor is further configured to configure a different maximum multiplexing number for a different transmission time of the precoded RA preambles.

2. The base station according to claim 1, wherein the maximum multiplexing number is indicated in one or more of a frequency resource multiplexing number, a time resource multiplexing number and a preamble index number.

3. The base station according to claim 2, wherein the processor is further configured to indicate the maximum multiplexing number corresponding to communication quality of the radio communication to the terminal.

4. The base station according to claim 1, wherein the processor is further configured to indicate the maximum multiplexing number corresponding to communication quality of the radio communication to the terminal.

5. A terminal comprising:
a processor coupled to a memory, configured to:
control radio communication with a base station, and
process a random access (RA) procedure with the base station,
wherein the processor transmits precoded RA preambles to the base station, wherein the precoded RA preambles are multiplexed into a radio resource in accordance with a maximum multiplexing number of the precoded RA preambles for a transmission time multiplexed into the radio resource capable of transmitting the precoded RA preambles, and the maximum multiplexing number is indicated by using downlink control information, and
wherein the processor is further configured to multiplex the precoded RA preambles into the radio resource in accordance with a different maximum multiplexing number configured for a different transmission time of the precoded RA preambles.

6. The terminal according to claim 5, wherein the maximum multiplexing number is indicated in one or more of a frequency resource multiplexing number, a time resource multiplexing number and a preamble index number.

7. The terminal according to claim 6, wherein the processor is further configured to:
measure communication quality of the radio communication, and
multiplex the IRA preambles into the radio resource in accordance with the maximum multiplexing number corresponding to the measured communication quality.

8. The terminal according to claim 5, wherein the processor is further configured to:
measure communication quality of the radio communication, and
multiplex the RA preambles into the radio resource in accordance with the maximum multiplexing number corresponding to the measured communication quality.

* * * * *